United States Patent [19]

Pouska

[11] 4,054,507
[45] Oct. 18, 1977

[54] DEWATERING WATER-WET PARTICLES AND BLENDING THE PARTICLES IN A LIQUID CARRIER

[75] Inventor: George A. Pouska, Littleton, Colo.

[73] Assignee: Marathon Oil Company, Findlay, Ohio

[21] Appl. No.: 675,392

[22] Filed: Apr. 9, 1976

[51] Int. Cl.² .................................. C10G 43/00
[52] U.S. Cl. .................................. 208/24; 137/13;
 137/547; 196/46.1; 208/187; 210/77; 210/403;
 302/51; 302/56; 302/66
[58] Field of Search ............... 208/24, 187, 370, 11 R,
 208/11 LE; 196/46.1; 210/403, 77; 137/547, 1,
 13; 302/51, 56, 66

[56] References Cited

U.S. PATENT DOCUMENTS 3,695,448 10/1972 Johansson ..................... 210/403
3,900,391 8/1975 Merrill et al. ..................... 208/370

FOREIGN PATENT DOCUMENTS 741,301 8/1966 Canada ..................... 208/11 LE

Primary Examiner—Herbert Levine
Attorney, Agent, or Firm—Joseph C. Herring; Jack L. Hummel

[57] ABSTRACT

Slurrying of water-wet wax particles in liquid hydrocarbon carrier is improved by introducing the water wet particles in a rotating perforated cylinder, e.g., screen, immersed in a flowing stream of liquid carrier above a settling chamber. The flow rates of the liquid carrier and the water-wet particles are controlled to give desired water separation and slurry concentrations for subsequent pipelining. The water falls to the bottom of the settling chamber for removal.

12 Claims, 1 Drawing Figure

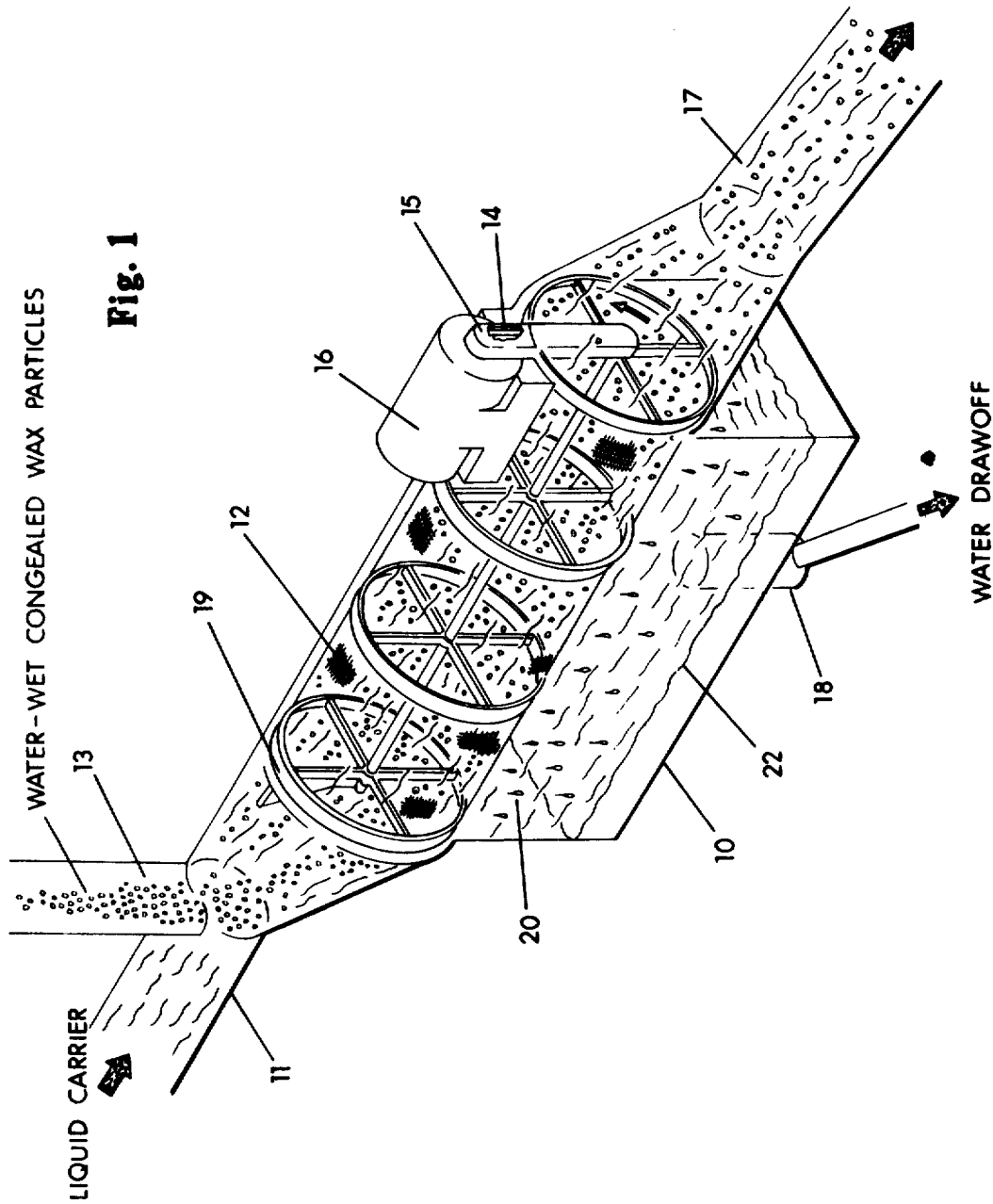

DEWATERING WATER-WET PARTICLES AND BLENDING THE PARTICLES IN A LIQUID CARRIER

FIELD OF THE INVENTION

This invention relates to a continuous process of dewatering and blending of wax particles in a water-immiscible liquid carrier to obtain a pumpable slurry. Dewatering is accomplished by passing the water wet beads into a rotating screen cylinder having a continuous stream of the liquid carrier passing therethrough.

PRIOR ART

Continuous dewatering of wet particles for slurrying in a hydrocarbon phase is difficult to achieve in a one step process. None of the prior art specifically directs itself toward the continuous dewatering and slurrying problem. Methods are disclosed for removing excess water or other solvent from the solid phase, dewaxing a waxy crude oil, or transportation of a relatively soft product such as peas in a slurry.

Examples of U.S. Pat. Nos. representative of the art include:

Chapman in 2,078,325 teaches a hydraulic system for conveying a slurry of peas in water which includes a device for dewatering the slurry.

Overbaugh in 2,115,211 teaches dewaxing of mineral oil by continuously filtering the chilled wax bearing mixture through a surface rotary vacuum continuous filter which is 60% submerged in wash solvent, with separation and recovery of dried filter cake and dewaxed mineral oil.

Long et al in 2,484,304 teaches an improvement of continuous rotary filters by the forming and working of a wax filter cake upon a traveling surface with dislodging of the filter cake by blowing gas through the filter and allowing residual oil back into the initial feed slurry by drainage through holes in the scraper blade.

Hurter in 2,664,204 extracts excess water from water-soaked bark through the use of a cylindrical revolving screen rotating about a horizontal axis.

Renberg in 3,032,545 teaches a method and apparatus for the agglomeration and separation of finely divided solids dispersed in a liquid.

Koga et al in 3,661,260 teaches a continuous separation of an oil slurry phase from an aqueous phase in a tower separator by retaining the mixture in the tower for a time sufficient to effect phase separation and drawing off the slurry and aqueous phase at rates sufficient to maintain the phase equilibrium within the tower.

Johansson in 3,695,448 teaches separating a liquid from a slurry in a device which comprises a perforated, rotating elongated drum containing an interspaced feed screw to advance the solid material through the drum while extracting water.

Cole et al in 3,711,400 teaches a continuous process for deoiling, dewatering and dewaxing sludges which comprises mixing the sludge with a light aliphatic hydrocarbon with separation of a water-waxy solid slurry and an oil-aliphatic hydrogen phase, heating said latter phase to extract the light aliphatic hydrocarbon and separation of a water-waxy solid slurry and an oil-aliphatic hydrogen phase, heating said latter phase to extract the light aliphatic hydrocarbon for recycling with the former phase for recovery of a wax-aromatic hydrocarbon phase.

Merrill in 3,846,279 teaches obtaining a hydrocarbon slurry containing wax beads by dispersing the wax as beads in a water column, congealing the beads and then passing the congealed beads through a water-hydrocarbon interface and into a hydrocarbon to obtain the slurry.

SUMMARY OF THE INVENTION

I have invented a method for continuously dewatering wax particles and slurrying the dewatered particles in a water-immiscible liquid carrier to obtain a pumpable slurry.

DESCRIPTION OF THE DRAWING

A water-immiscible liquid carrier enters chamber 10 via conduit 11. Water-wet wax particles enter perforated cylinder (screen) 12 mounted on frame 19 via conduit 13. Screen 12 is rotated by motor 16 and suitable driving means 14 which is covered by casing 15. Screen 12 has a mesh size smaller than the diameter of the wax particles. The separated water, settles to the bottom of chamber 10 and is drawn off through drain 18. Liquid carrier 20 forms an interface 22 with the water. The dewatered slurry exits the settling chamber through conduit 17.

PREFERRED EMBODIMENTS OF THE INVENTION

A water-wet wax particle slurry from a prilling or beading tower or other similar operations is dewatered and slurried with a water-immiscible liquid carrier in a perforated, rotating cylinder. The wax particles are substantially spherical and have an average diameter of about 0.5mm to about 50mm or more and preferably about 0.1mm to about 20mm and most preferably about 0.3mm to 10mm. The water-wet wax particles enter the rotating cylinder concurrent with the liquid carrier stream. By transporting the water-wet wax particles across the horizontal screen, the process is aided by gravity to enhance separation. The velocity of the water-wet wax particles entering the liquid carrier stream is limited by the need to maintain a velocity less than about 0.1 ft/sec. in the chamber.

The liquid carrier must be water-immiscible and have a specific gravity less than that of the water. It is preferably an overhead fraction from the distillation of a waxy crude oil. The wax particles are preferably obtained from the bottom fraction of the same distillation. Examples of liquid carrier include crude oil (both sweet and sour), partially refined fractions thereof and refined fractions of crude oil. Specific examples include side cuts from crude columns, crude column overheads, gas oils, kerosene, heavy naphthas, naphthas, straight run gasoline, and liquefied petroleum gases. Pure hydrocarbons are also useful, e.g. paraffin compounds including propane, pentane, heptane, decane, dodecane, etc.: cycloparaffin compounds including cyclohexane, etc.; aryl compounds including benzene, naphthalene, anthracene, etc.; alkylated products thereof including toluene, alkyl phenols, etc. Examples of preferred aromatic hydrocarbons include product streams form catalytic reformers and preferred cuts of said streams; catalytic cracked hydrocarbon streams such as gasoline, LCCO (light catalytic cycle oil), etc.; thermally cracked distillates such as coker distillate, etc.; and hydrocarbons such as benzene, toluene, xylene, cumene, naphthalene, etc.

The dewatering and slurrying apparatus should be designed so that the velocity of the liquid carrier passing through the perforated cylinder is less than about 0.1 ft/sec. and preferably less than about 0.075 ft/sec. This upper limit on velocity is needed to permit proper dewatering of the water-wet wax particles. Upon completion of the dewatering and blending process, a substantially water-free slurry is obtained containing a water-immiscible liquid carrier and wax particles. This slurry exits under substantially laminar or transitional flow conditions.

The quantity of congealed wax particles entering the perforated cylinder should be sufficient to obtain a concentration of about 1% to about 80% and preferably about 5% to about 55% and more preferably about 10% to about 50% by weight in the liquid carrier. During the slurrying operation, the temperature of the liquid carrier is preferably about 30° below to about 30° above and more preferably about 20° below to about 20° above the minimum, seasonably ambient temperature of the transportation system; the latter being the means by which the resulting slurry is to be transported, preferably in a pipeline. The temperature during dewatering and slurrying is preferably at least about 5° F. and more preferably at least about 15° F. and most preferably at least about 30° F. below the solution temperature of the wax particles in the liquid carrier. The perforated cylinder, e.g., screen, should rotate at a speed sufficient to facilitate separation of the water from the wax particles, e.g. up to 100–200 rpm. i.e., the centrifugal force exerted on the water should be sufficient to force it through the perforations. However, the centrifugal force should not be sufficiently large to substantially distort the shape of the wax particles. The rotational speed is a function of the particle size, operating temperature, desired slurry concentration, etc.

The slurry of liquid carrier and congealed wax particles is preferably transported in a conduit which in at least its major initial length is below the solution temperature of the wax particles in the liquid carrier. The average maximum temperature of the conduit is preferably at least about 1° F. and more preferably at least about 5° F. and most preferably at least 10° F. below the average solution temperature of the wax particles within the slurry. Solution temperature as used herein means the temperature at which substantially all the wax particles are solubilized within the continuous phase of the slurry. In addition, the average temperature of the conduit should not be below the average pour point of the liquid carrier and preferably is at least about 1° F. and more preferably at least about 5° F. above this pour point. The following examples are presented to teach working embodiments of the invention. Unless otherwise specified, all percents are based on volume.

EXAMPLE I

A blending chamber large enough to handle 10,000 bpd of a hydrocarbon slurry containing 35% wax beads by weight is constructed. A perforated cylinder 6 ft. in length and 3 ft. in diameter, the perforations being about 50 mesh size, is rotatably mounted in the chamber. A 6 inch diameter conduit (pipe), perpendicular to the longer axis of the cylinder, and mounted as defined in FIG. 1 permits water-wet wax particles to flow directly into the mainstream of a hydrocarbon liquid carrier flowing at a velocity of about 2 ft/sec. into the perforated cylinder, the perforated cylinder rotating at about 150 rpm. The liquid carrier is an overhead fraction from the distillation of a waxy crude oil and the wax particles are obtained by dispersing the bottom fraction from the distillation as beads into a water column and congealing the dispersed wax particles to obtain a slurry of water and wax particles. The diameter of the chamber is about 4 ft. and there is a settling area in the bottom of the chamber to accumulate the water obtained from dewatering the wax particles. An interface of the liquid carrier and the water is present below the bottom of the cylinder. A valve in the bottom of the settling area permits drainage of the water. About 6500 bpd. of the overhead fraction and about 5000 bpd. of the water slurry containing 70% wax beads enter the chamber. Water is drained from the settling area to maintain a constant interface. A hydrocarbon slurry containing dewatered wax particles exits the chamber through a 6 inch pipe to the suction of a pipeline pump and the slurry is transported in the pipeline at conventional pipeline pressures.

EXAMPLE II

A blending chamber as described in Example I is used to dewater water-wet wax particles of about 5 mm in diameter and then blend them with an overhead fraction. About 500° bpd. of water slurry containing 70% of wax beads and about 6500 bpd. of overhead fraction is introduced into the chamber. The chamber is operated at about 80° F. and at an internal pressure of about 50 psig. Velocity of the liquid carrier flowing through the cylinder is about 0.075 ft/sec. The resulting slurry exiting from the chamber is successfully transported through a pipeline.

It is not intended that the examples limit the invention. Rather, it is the intent that all equivalents obvious to those skilled in the art be incorporated within the scope of the invention and defined in the specifications and appended claims.

What is claimed is:

1. In a process wherein wax particles are congealed in the presence of water and wherein the water containing congealed wax particles is slurried in a liquid, water-immiscible carrier having a density less than water to obtain a pumpable slurry, the improvement of minimizing water contamination in the slurry comprising passing said water containing congealed wax particles into a chamber having a rotating perforated cylinder mounted therein, the cylinder having an inlet and outlet means, through which the water-immiscible carrier flows; the cross-sectional area of the cylinder, the diameter and number of the perforations within the cylinder being sized, the flow rates of the water-immiscible carrier and the water containing the congealed particles, and the rotation of the cylinder being sufficiently fast to permit the water to pass through the perforations and form an interface with said liquid carrier below the cylinder, and a slurry containing substantially water-free congealed wax particles and liquid carrier is withdrawn through the outlet of the cylinder to obtain the pumpable slurry.

2. The method of claim 1 wherein the water containing the congealed particles enters the cylinder at an angle to the flow of the liquid carrier.

3. The method of claim 1 wherein said carrier liquid is a liquid hydrocarbon.

4. The method of claim 3 wherein said liquid hydrocarbon is an overhead fraction from the fractionation of a waxy crude oil.

5. The method of claim 1 wherein the average diameter of the congealed wax particles is about 0.5 to about 50 mm.

6. The method of claim 1 wherein the congealed wax particles are substantially spherical.

7. The method of claim 1 wherein the velocity of the liquid carrier passing through the cylinder is less than about 0.1 ft/sec.

8. The method of claim 1 wherein the concentration of the congealed wax particles in the liquid carrier exiting from the cylinder is about 5 to about 55 percent by weight.

9. The method of claim 1 wherein the temperature of the congealed wax particles within the chamber is below the solution temperature of the congealed wax particles in the liquid carrier.

10. The method of claim 1 wherein the slurry is withdrawn from the device under substantially laminar flow conditions.

11. The method of claim 1 wherein the slurry is withdrawn from the cylinder under substantially transitional flow conditions.

12. The method of claim 1 wherein the dewatered slurry is withdrawn from said device under substantially turbulent flow conditions.

* * * * *